Figure 1:
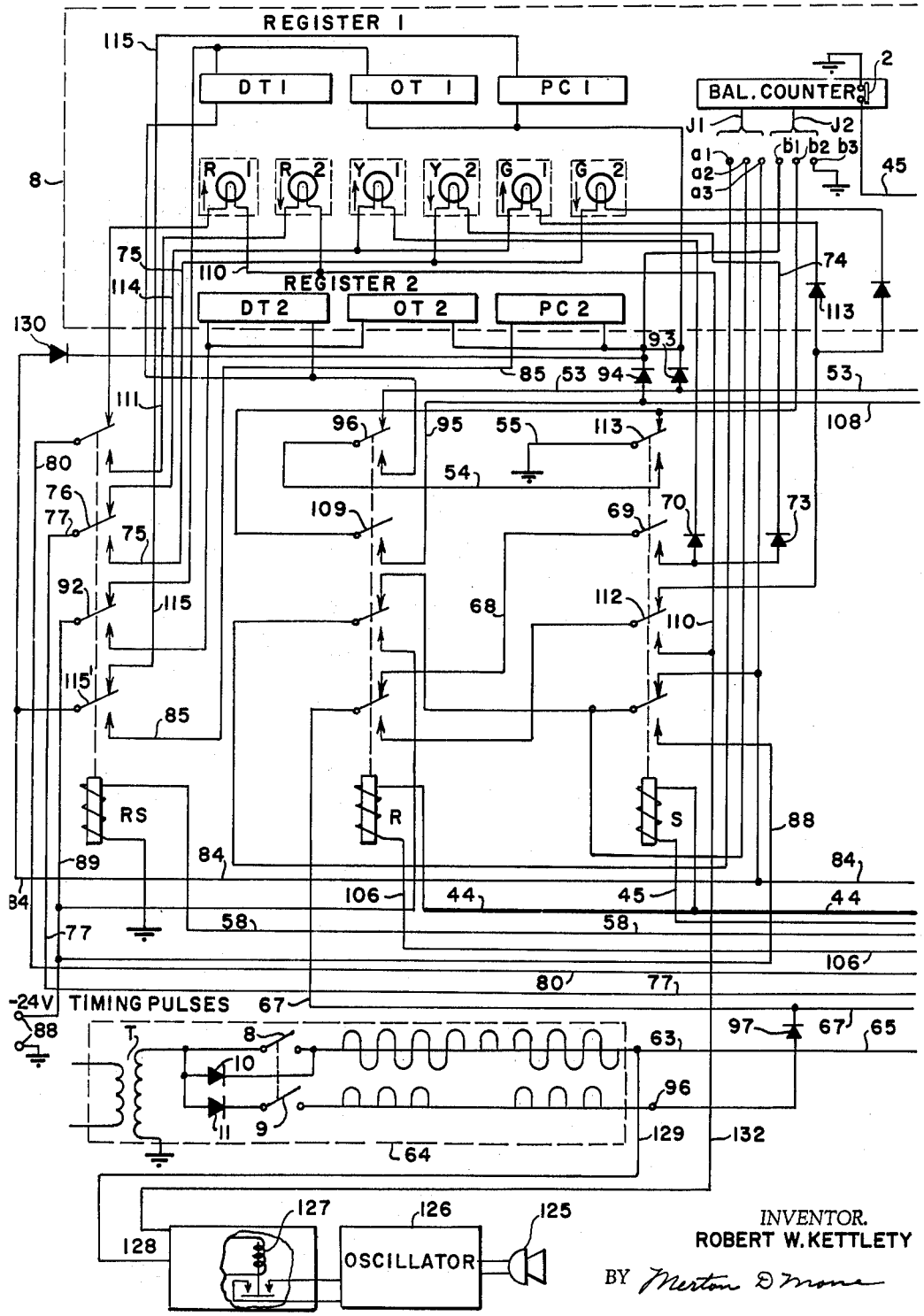

Oct. 19, 1965  R. W. KETTLETY  3,213,267
DATA ACCUMULATION SYSTEM
Filed May 18, 1961  2 Sheets-Sheet 1

INVENTOR.
ROBERT W. KETTLETY
BY Merton D. Moore
ATTORNEY

INVENTOR.
ROBERT W. KETTLETY
BY Morton D. Moore
ATTORNEY

United States Patent Office 3,213,267
Patented Oct. 19, 1965

3,213,267
DATA ACCUMULATION SYSTEM
Robert W. Kettlety, Phoenix, Ariz., assignor to General Electric Company, a corporation of New York
Filed May 18, 1961, Ser. No. 110,922
10 Claims. (Cl. 235—92)

My invention relates to data accumulation systems and particularly to such systems contemplated for factory use.

Heretofore, systems have been proposed for use in factories to accumulate at a common point certain data generated on the factory floor, such as the operating time of a machine, work performed or parts produced, during such operating time, and "down" or "delay" time encountered in the use of the machine. United States Patents 2,425,124, issued August 5, 1947 and 1,242,483, issued October 9, 1917 are directed to such systems. Such information may be accumulated at a foreman's, or dispatcher's office, where it may be utilized in computing pay for the machine operators, for comparison with requirements of the job on which the machine is used, dispatching further use of the machine, etc.

Tn object of my invention is to provide a system to register at the central point somewhat more comprehensive data with respect to each machine and which is so devised that maximum economy, practicability, and utility of the system is achieved.

A further object of my invention is to furnish continuous indications at the central point of (1) the operating time of each machine, (2) the number of production occurrences, such as parts produced during such operating time, (3) delay time encountered during such operating time, (4) time required for setting up the machine, (5) performances produced during such set up time, and (6) delay time encountered during such set up time.

A further object of my invention is to provide signaling means indicating at the central station the instant status of the machine and the character of the data being registered at any instant, to provide certain signaling from the central point to the dispatcher's station and other signaling from the operator's station to the central point, or to the factory floor such, for example, as may be required to bring help, materials, as assistance to the operator, all to the end of producing maximum practical use of each machine on the factory floor.

A further object of my invention is to provide such means that are economical to construct and practical to operate and which operate with a minimum of conductors between the operator's station and the central point.

In carrying my invention into effect a switch is provided at the operator's station having positions corresponding to the "Set Up" and "Run" condition of the machine and a third position corresponding to the delay condition of the machine, to which third position the switch may be actuated from either of the first two positions of the switch. In addition, an indication lamp is provided for each position of the switch.

At the central point two registers are provided each comprising three counters, one to count performances, or work done, at the operator's station, a second to measure operating time, and a third to measure delay time. A lamp, or other indicator, is provided for each of the six counters and which is lighted when data is being registered on the respective counter.

One register may be used to record operating time and performances produced, when the switch is in the run position, and delay time encountered while the switch is in that position. The other register may be utilized to record set up time and performances produced while the operator's switch is in its set up position and delay time encountered while the switch is in the set up position.

Of course, upon encountering delay the operator moves his switch to the delay position from the position in which it is when the delay is encountered.

Means are also provided whereby the switching necessary to effect such control of the registers is effected over a single pair of conductors to the operator's station, plus a ground, or third conductor, return, as desired, and whereby the signal lamps are controlled to effect the necessary signal operations both ways by a single additional conductor to the operator's station.

Since normally most data registered is registered when the switch is in the run position it is desirable, from the standpoint of most practical use of the equipment, that the registers be alternated on successive shifts, i.e., that one register be used for the run condition and the other for set up condition during the day shift and said one register be used for set up and the other for run during the night shift. My invention incorporates means to effect this alternation of the registers automatically.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawing in which FIGS. 1 and 2, taken side by side, with FIG. 2 at the right, and lines extending from one figure to the other in alignment illustrate an embodiment of my invention.

Figure 2:
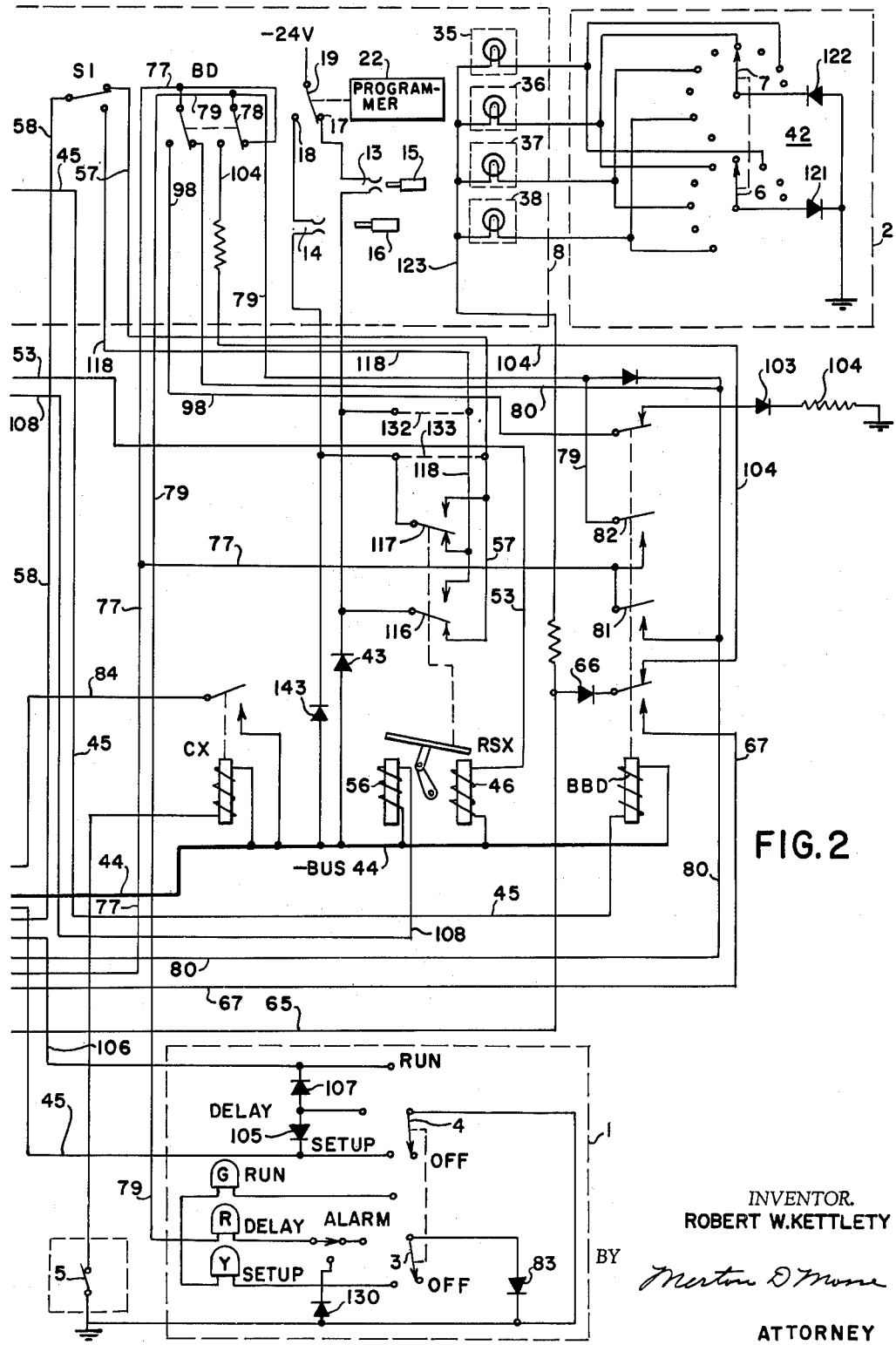

Referring first to FIG. 2 of the drawing, I have illustrated therein two dotted rectangles, 1 and 2. These rectangles represent equipment which may be associated with a machine on a factory floor. Each machine on the floor may be provided with a signal box, or individual signal boxes, corresponding to and embodying the equipment represented in the rectangles 1 and 2.

The equipment illustrated by rectangle 1 comprises a pair of switches 3 and 4 having four positions and which are mechanically connected together to be operated in unison to each of these four positions. These positions comprise an "off" position on which they are illustrated, and to which they may be operated when the machine is not in use; a "set up" position to which the switches may be actuated when the machine is to be prepared for use; a "delay" position to which they may be actuated when delay occurs for any cause, as when disabled for any reason, as for want of repairs or want of materials on which to operate; and a "run" position to which it is actuated during normal operation of the machine.

The box also incorporates three lamps designated on the drawing by the letters G, R and Y corresponding to green for the run condition, red for the delay condition, and yellow for the set up condition, of the operator's station. Each lamp is lighted when the switch is in the corresponding position, indicating not only the position of the switch but that proper relay action at the remote station has taken place in response to operation of the switch.

It also includes an alarm switch designated by the legend Alarm and the function and purpose of which will later be indicated.

Associated with the station is a pair of contacts 5 which are operated each time a desired function is performed with respect to which data is to be registered. These may be operated by hand or, if the machine be making parts or pieces, they may be operated automatically each time the machine is operated, or a piece is produced.

Rectangle 2 represents a rotary selector switch located at the operator's station, which comprises a pair of switches 6 and 7 each operable through 9 positions for signaling, paging and other communication purposes, which will later be indicated.

At a central point, such as in the foreman's, or dispatcher's office, is a panel of equipment represented by the rectangle 8 in FIGS. 1 and 2 which equipment is controlled from the operator's station, there being one such panel for each machine on the factory floor, which is provided with a signal box 1.

The equipment represented by the rectangle 8 comprises two registers, which, on the drawing, bear the legend Register 1 and Register 2. Register 1 comprises a piece counter PC1 which counts performances at the operator's station such as pieces produced. It also comprises an operating time counter OT1 for measuring operating time, that is the time when pieces are or may be produced. It also comprises a delay time counter DT1 which measures delay time of the machine, that is time when switches 3 and 4 are in the delay position.

Register 2 comprises similar counters designated PC2, OT2 and DT2.

Normally, register 1 is utilized during one shift, to register operating time and pieces produced, with set up time being counted on register 2. During the second shift register 2 is utilized in the same way with set up time being counted on register 1. Delay time in each instance is counted on the timer DT1 or DT2 corresponding to the position "Set Up" or "Run" from which switch 4 was last actuated to the delay position.

The panel also incorporates six lamps, two Red (Delay), two Green (Run) and two Yellow (Set Up), which are selectively lighted at appropriate times, and which preferably are positioned between the two registers and provided with arrows pointing to the register on which data is being accumulated during the respective interval. These lamps not only indicate the proper register, but also, like those at the operator's station, indicate that all of the various relays necessary to the registration of data has functioned properly in response to operation of the operator's selector switch.

The panel 8 also incorporates a balance counter bearing the legend "BAL. COUNT." This is a preset counter which may be set for any desired number of pieces to be produced on a particular job, or any amount of time allowed for producing them, in preparing for production, or for delay intervals. It counts downward from the preset quantity until the quantity for which it is set is exhausted when it opens a pair of contacts 2 in response to which a signal is operated notifying the dispatcher, or operator, or both, either that the job is completed or that the time is exhausted. This signal may be given by causing lamps previously lighted continuously to be lighted intermittently.

This counter is provided with terminal plugs J1 and J2 for insertion in suitable jacks a1, a2, and a3 for plug J1, and b1, b2 and b2 for plug J2, which packs are connected to points in the system to supply pulses to the counter from which time, or pieces, are computed and indicated.

The panel also incorporates a pair of jacks 13 and 14, one corresponding to the one shift and the other corresponding to a second shift, each of which may receive a plug 15 or 16, which the operator inserts into the jack when he reports for work. This plug may bear the respective employee's name, number, or other designation.

The upper terminals of the jacks 13 and 14 are connected to respective contacts 17 and 18 of a double throw switch 19 the armature of which is connected to the negative terminal of a 24 volt source of potential the positive terminal of which is grounded. This switch is operated between its two positions by means of a programmer 22 bearing that legend on the drawing. This programmer is a timer which operates the switch to its right-hand position for one shift, typically the day shift, and to the left-hand position for another shift, typically the night shift, for example, thereby energizing appropriate circuits for operation of certain of the equipment herein to be described.

The panel also incorporates a register selector switch S1 having two positions and which may be operated from one position to the other to reverse the registers being used. As previously stated, during the day shift register 1 may be used with set up time counted on register 2, whereas during the night shift the reverse is true. It may occur that in operation of the equipment the night shift will continue work performed during the day by the day shift on a particular job, and it may be desired to accumulate on the same register that was used during the day time the data generated at the machine during the night shift. This may be effected by operation of the register selector switch S1.

The panel also incorporates a blinker disabling switch BD. When the switch 2 in the balance counter opens, indicating that the quantity, or time, that was preset on that counter has been reached, the lamps then light intermittently thereby warning the operators at the two stations that the quantity is exhausted. This may indicate that the job is completed or that allowed time has expired.

Some times it is preferred that the lamp lighted at the operator's station continue to be lighted continuously, whereas it is desired that those at the dispatcher's station be lighted intermittently. This may be effected by operation of the BD switch to its left-hand position as shown on the drawing.

At the right side of the panel A are shown four lamps 35, 36, 37 and 38, each of which is connected to two different contacts on the selector switch 42 at the operator's station. By operating that switch to a corresponding position each lamp may be operated either continuously or intermittently in accord with the signal desired to be communicated by the operator to the dispatcher.

The balance of the equipment is arranged at the foreman's or dispatcher's station where the panel 8 is located and comprises principally six relays as follows. A register selector relay RS, shown at the left-hand side of FIG. 1, having contacts which select the register to be used and the lamps in the panel 8 to be lighted. The operation of this relay RS is principally controlled by a register selector auxiliary relay RSX in FIG. 2.

It also includes a run relay R which is energized when the operator's selector switch is in the Run position and a set up relay S which is operated when the operator's selector switch is in the set up position, and each of which energizes a corresponding winding of auxiliary relay RSX. Both of these relays are operated when the selector switch is in the delay position and cooperate to deenergize the RSX relay to leave it in the position to which it was last operated. This means that the delay time is measured on the register last previously used.

It also comprises a relay CX which responds to the switch 5 to produce pulses for actuation of the piece counters.

It further comprises a relay BBD which in cooperation with the BD switch controls the continuous and intermittent energization of the lamps.

The armatures of all of these relays are illustrated in the position they occupy when the coil is deenergized, the armatures of relay RSX being in the position to which it is actuated by its winding 46.

Power for operation of the relays and piece counters of the system is supplied from a continuous negative 24 volt source through a programmer controlled switch 19.

Power for operation of the timers is supplied from a source of negative 24 volt pulses supplied to terminals 88 at the rate of 100 pulses per hour.

Power for operation of the signal lamps is supplied by an equipment 64 which produces at terminals 63 both continuous positive pulses and intermittent negative pulses and which produce at terminal 96 only intermittent positive pulses. The equipment is described hereinafter.

Having thus indicated the general character of the equipment to be described, I shall now proceed with a more detailed description of its structure and operation.

Let us suppose that the operator reports for work on the day shift and inserts his plug 15 into the jack 13. The switch 19 is in its right-hand position and completes the circuit through the jack to the equipment to be described. This immediately energizes the winding of the BBD relay through a circuit extending from the minus 24 volt source through switch 19 in its right-hand position, jack 13 and operator's plug 15, unilaterally conducting device 43, conductor 44 which will hereafter be referred to as common bus 44, winding of relay BBD, conductor 45 and the closed contacts 2 in the balance counter to ground.

The unilateral conducting device 43 is one of several used in the system and which may comprise suitable solid state devices such as those of germanium or silicon but which I shall hereinafter refer to as diodes. The direction of current flow in these devices is in the direction of the arrow used in the symbol representing the diode.

The BBD relay is thus operated to attract its armatures whenever power is applied to the system and the contacts 2 of the balance counter are closed.

Set up condition

The operator then moves his switches 3 and 4 at his station 1 from the off position to the set up position while he prepares the machine for operation, and perhaps prepares some pieces to be produced. This energizes the winding of set up relay S through a circuit extending from the common bus 44, which is now at negative potential, through the winding of relay S, conductor 45, and switch 4 in its set up position to ground.

Relay S attracts all of its armatures and thereby completes a circuit for winding 46 of the RSX relay which circuit extends from the common bus 44 through winding 46 of relay RSX, conductor 53, armature 96 of relay R in its upper position, conductor 54, armature 113 of relay S in its lower position, to ground at 55.

Winding 46 of relay RSX attracts the armatures of the RSX relay to the position shown in the drawing. This RSX relay has two windings 46 and 56 and is operated to one position by winding 46 and to the opposite position by winding 56. Its armature is provided with a toggle to retain it in the position to which it was last operated after the winding by which it was operated becomes deenergized.

Operation of relay RSX to the position shown energizes the winding of register selector relay RS through a circuit extending from the minus 24 volt source through switch 19, jack 13, armature 116 of the RSX relay in its lower position, conductor 57, switch S1, conductor 58, and winding of relay RS to ground. Relay RS operates all of its armatures to their lower positions opposite that shown in the drawing.

Circuits are now established for all of the timers, the piece counter and signal lights.

Lamps during set up

The circuit for the yellow lights extends from terminal 63 of a source of signal voltage represented by the rectangle 64, shown near the bottom of FIG. 2, through conductor 65, diode 66, lower armature of the BBD relay in its lower position, conductor 67, lower armature of relay R in its upper position, conductor 68, armature 69 of relay S in its lower position, diode 73, conductor 74, yellow lamp Y2, conductor 75, armature 76 of relay RS in its lower position, conductor 77, armature 78 of the BD switch in its right-hand position, conductor 79, yellow lamp Y at the operator's station, switch 3 in the set up position and diode 83 to ground.

The voltage at the terminal 63 comprises a continuous series of positive pulses for which the diode 66, 73 and 83 are poled to conduct and thus the yellow lamp Y at the operator's station and the yellow lamp Y2 at the dispatcher's station are lighted continuously. The negative pulses at terminal 63, which are intermittent, are ineffective because of the unilateral conducting devices 66, 73 and 83.

The yellow lamp Y2, at the dispatcher's station, bears an arrow pointing to register 2 indicating that the set up time and pieces produced during set up are being counted on register 2. It will be noted that the circuit of yellow lamp Y at the operator's station includes contacts on all of relays R, S, RS, and BBD and switch BD. Thus the lighting of this lamp indicates that proper relay action has occurred and that the equipment is in order to register operations at the operator's station.

Pieces counted during set up

Switch 5 is operated each time a piece is produced and causes operation of relay CX through an obvious circuit. Relay CX completes the circuit for piece counter PC2 which extends from the negative bus 44 through the contacts of CX relay when closed, conductor 84, lower armature of relay RS in its lower position, conductor 85, piece counter PC2, diode 93, conductor 53, upper armature of relay R in its upper position, conductor 54, armature 113 of set up relay S in its lower position, to ground at 55. Thus, any pieces produced during the set up period are registered on the piece counter PC2.

Operating time during set up

Operating time during set up is registered on an operating time register OT2 of Register 2. These time counters, such as OT2, are pulse responsive devices and are supplied with timing pulses from a source, which may be connected to the terminals 88 shown at the left side of FIG. 1. These pulses are of negative polarity with respect to ground and occur ever $\frac{1}{100}$ of an hour, or every 36 seconds. Thus the different counters may be digital devices and count time in hundredths of an hour.

The circuit from timer OT2 extends from the negative 24 volt terminals 88 through conductor 89, armature 92 of the RS relay in this lower position, timer OT2, diode 93, conductor 53, armature 96 of relay R in its upper position, conductor 54 and upper armature of relay S in its lower position, to ground at 55.

Balance counter operation

Now let us suppose that the operator, at the beginning of the set up period, had inserted his plugs J1 and J2, which are the terminals of the preset balance counter, in appropriate jacks to count pieces produced during set up. Thus, for example, plug J1 might be inserted in jack $a3$ which is connected to the armature of the CX relay and the plug J2 may be inserted in jack $b3$ which is connected to ground. Thus this counter counts pieces produced during the set up condition and should the preset quantity set up on the counter be exhausted during that condition switch 2 in the balance counter would open. This deenergizes relay BBD causing it to interrupt the previously traced circuit for the yellow lamps at its lower armature thereby disconnecting the lamps and conductor 67 of the previously traced lamp circuit from terminal 63 of the signal source 64. However, conductor 67 is still connected through diode 97 to the terminal 96 of source 64, which terminal supplies intermittent positive pulses which are synchronous with the positive pulses at terminal 63. Thus the lamps Y2 and Y are now lighted intermittently instead of continuously as before.

This same intermittent operation of the lights could have been had in response to expiration of the allowed time for set up had the balance counter been preset for the allowed time and plugs J1 and J2 inserted in jacks provided for the counting of such time. Plugs J1, for example, could have been plugged into jack $a2$ which is connected through the lower armature of relay S when in its lower position to the timing pulse source at 88. Plug J2 could have been plugged into jack $b3$ which is connected to ground.

The jacks a1, a2, and a3; and b1, b2, and b3 are connected to points in the circuit such that for each position of the operator's switch the balance counter registers time (T) or pieces (P) in accord with the following table. In this table each vertical column indicates by a T, for time, or a P, for pieces, the type of data recorded on the balance counter when the switch is in the position shown in the left-hand column and the plugs indicated in the left-hand column are in the jacks indicated by the respective vertical column.

*Balance counter*

| Plug: | | | | | | | | | |
|---|---|---|---|---|---|---|---|---|---|
| J1 | a1 | a2 | a3 | a1 | a2 | a3 | a1 | a2 | a3 |
| J2 | b1 | b1 | b1 | b2 | b2 | b2 | b3 | b3 | b3 |
| Switch position: | | | | | | | | | |
| Run | T | P | P | T | P | P | T | P | P |
| Set up | T | T | P | | | | T | T | P |
| Delay | | | | | | | T | T | P |

*Blinker disable*

Should it be desired to have the yellow light Y2 lighted intermittently while the yellow light Y at the operator's station continues to be lighted continuously, the blinker disable switch BD may be operated to its left-hand position. In that position the circuit of the yellow light Y2 at the dispatcher's station extends from conductor 77 of the previously traced circuit, not through lamp Y as before, but through the left-hand armature of the BD switch in its left-hand position, conductor 98, upper armature of the BBD relay in its upper position, diode 103 and resistance 104 to ground. Resistance 104 may be of value to simulate the resistance of the lamp. Thus lamp Y2 continues to light intermittently.

The circuit of the lamp Y at the operator's station now extends from terminal 63 of source 64 over conductor 65, diode 66, lower armature of the BBD relay in its upper position, condutcor 104, armature 78 of the BD switch in its left-hand position, conductor 79, lamp Y, switch 3 in its set up position and diode 83 to ground. Thus lamp Y is now continuously energized by the continuous positive pulses at terminal 63 of source 64.

*Delay during set up*

Now let us suppose that, during the set up condition, with switches S1 and BD in their normal positions, and relay BBD energized through balance counter switch 2, the operator runs into difficulty. This may be due to breakdown of the equipment, or shortage of materials. He is thus encountered with delay.

He may operate his switches 3 and 4 to the delay position. Both relays R and S are now energized, the relay S being energized through the same circuit as before excepting that diode 105 is inserted by the switch 4. Relay R is energized through a circuit extending from the negative bus 44 through the winding of relay R, conductor 106, diode 107 and switch 4 to ground. The diodes 105 and 107 are poled oppositely to permit separate energization of the two relays R and S from the same source through the switch 4, without conflict with other circuits. They are both poled to pass current in the same direction as the diodes 43 and 143 through which the negative bus is alternately energized by switch 19.

Relay RSX remains in the same position as before since both of its two windings are deenergized. The circuit of winding 46 is interrupted at the upper contact of relay R since the cooperating armature is in its lower position. The circuit of winding 56, which extends through conductor 108, conductor 95, and armature 109 of relay R in its lower position, is interrupted at the upper contact of relay S, the cooperating armature 113 of which is in its lower position. Therefore, relay RSX remains in the same position as before, relay RS remains energized, and the delay time is counted on delay timer DT2 of register 2. This circuit extends from the source of 24 volt timing pulses at 88 through armature 92 of relay RS in its lower position, delay timer of DT2, armature 96 of relay R in its lower position, conductor 54 and armature 113 of relay S in its lower position to ground at 55.

*Lamps during delay during set up*

Red lamp R2 is lighted through a cirgiut which extends from terminal 63 through conductor 65, diode 66, lower armature of the BBD relay in its lower position, conductor 67, lower armature of relay R in its lower position, armature 112 of relay S in its lower position, conductor 110, lamp R2, conductor 111, upper armature of relay RS in its lower position, conductor 80, armature 81 of relay BBD, conductor 77, armature 78 of switch BD, conductor 79, red light R, switch 3 and diode 83 to ground. Thus red lights R2 and R are continuously energized indicating the proper condition of the equipment for desired registering of the delay. Red lamp R2 bears an arrow pointing downward indicating that delay time is counted on Register 2.

It will be noted that conductor 80, unlike conductor 67, is not connected through diode 97 to the intermittent pulse source at 96 and is thus not arranged for intermittent operation on deenergization of the BBD relay.

It will now be observed that all of the data thus far accumulated has been accumulated on register 2, certain of this may also have been accumulated on the balance counter, dependent on the jacks into which plugs J1 and J2 were inserted, if in any. This is true even with respect to the delay time which accumulated after the operator moved his switch from the set up condition to the down position because this was delay occasioned during the setting up of the equipment. This is also true even though during normal running conditions on the same shift data is normally accumulated on Register 1.

*Run condition*

Let us assume that the operator overcomes the difficulty encountered during set up and operates his switch to the run position, data will now be accumulated on Register 1.

Set up relay S is now deenergized by switch 4 but the run relay R remains energized. Winding 56 of relay RSX is now energized through a circuit extending from the negative bus 44 through that winding, conductor 108, conductor 95, armature 109 of relay R in its lower position, and armature 113 of relay S in its upper position to ground at 55. Winding 56 attracts the armature of the relay RSX, throwing the toggle to the opposite position from that illustrated, and operating the switch armatures to their upper position. Movement of the lower armature 116 of RS to its upper position deenergizes relay RS, and its armatures move to the upper position to establish circuits for the timers and lamps on the panel 8. These circuits may be traced as follows.

*Lamps during run*

The circuit for the green lamps extend from the terminal 63 of source 64 through conductor 65, diode 66, lower armature of the BBD relay in its lower position, conductor 67, lower armature of relay R in its lower position, armature 112 of relay S in its upper position, diode 113, green lamp G1, conductor 114, armature 76 of relay RS in its upper position, conductor 77, armature 78 of switch BD, conductor 79, green lamp G at the operator's station, switch 3 in its run position and diode 83 to ground. Green lamp G1 bears an arrow pointing upward indicating that data is now being accumulated on Register 1. The circuit initiated armatures of relays BBD, R, S, RS and switch BD. Thus the green lamps indicate the proper condition of these relays for registering operations during the run condition.

It will be noted that the portion of the green lamp circuit just traced, which is on FIG. 2, is the same as for the yellow lamp, except for substitution of the lamp, itself.

Thus the operation of switch BD to its left-hand position, in the event of opening of switch 2 in the balance counter, has the same effect as before. It connects the conductor 77 through conductor 98, upper armature of relay BBD in its upper position, diode 103 and resistance 104 to ground thereby permitting intermittent operation of green lamp G1. Also by its armature 78 it connects green lamp G at the operator's station through conductor 104, lower armature of relay BBD in its upper position, diode 66 and conductor 65 to terminal 63 which is supplied with continuous positive pulses causing green lamp G to light continuously.

*Piece count during run condition*

Pieces produced are now counted by the piece counter PC1, which is supplied with pulses through a circuit extending from the negative bus 44 through the contacts of the CX relay, conductor 84, lower armature of relay RS in its upper position, conductor 115, piece counter PC1, diode 94, conductor 95, armature 109 of relay R in its lower position, armature 113 of relay S in its upper position to ground at 55.

It may be noted here that when the contacts of relay CX open, a transient impulse occurs across the operating coils of the counter PC1, or PC2, which is in use, the transient being positive on the conductor 115, or 85, as the case may be, and opposite in polarity to the normally applied operating pulse. In order to dissipate this transient the armature 115′ of relay RS is arranged to connect these conductors 85 and 115 through diode 130 to the opposite side of the respective counter.

*Operating time during run condition*

Operating time is measured by operating time counter OT1 through a circuit which extends from the minus 24 volt source of timing pulses at 88 through armature 92 of register selector relay RS in its upper position, operating time counter OT1, diode 94, conductor 95, armature 109 of run relay R in its lower position and armature 113 of set up relay S in its upper position, to ground at 55.

*Delay time during run*

If during the run condition of the operator's switches 3 and 4 he encounters delay as for reason of breakdown or want of materials, he operates his switch to the delay position in which, as previously explained, both relays R and S are energized thereby deenergizing both windings of 46 and 56 of the relays RSX, leaving that relay in the condition in which it was in, the run condition, and in which it deenergizes the winding of relay RS.

This delay time will now be measured by the delay time counter DT1 of Register 1 through a circuit extending from the minus 24 volt source of timing pulses at 88 through armature 92 of relay RS in its upper position, delay time counter DT1, armature 96 of relay R in its lower position, conductor 54, and armature 113 of relay S in its lower condition to ground at 55.

Thus during the run condition all data is accumulated on Register 1 and during the set up condition all data is accumulated on Register 2 but that during the delay condition data is accumulated on the register being utilized when the delay was encountered. That is, if the switches 3 and 4 be moved from the run position to the delay position and Register 1 is utilized during the run condition, then delay is counted on Register 1. Similarly, if delay is encountered while the switch is in the set up condition and Register 2 is being utilized during set up time, then the delay time is counted on Register 2.

*Night shift*

It will be remembered, however, that the registers are reversed for the night shift from what they are during the day shift. This is effected by programmer 22 which switches the negative 24 volt source from jack 13 to jack 14 in which the night operator may insert his plug 16. Thus the negative 24 volt potential, which was previously applied to the armature 116 of the RSX relay and thence through conductor 57 and switch S1 in its upper position to the winding of relay RS, is applied to the armature 117 of the RSX relay and thence through the same connection as previously but only when the armatures 116 and 117 are in their upper position, that is when the RSX is in its alternate position. Thus, while the RS relay was energized during the run condition and deenergized during the set up condition during the day shift, it is now deenergized during the run condition and energized during the set up condition thereby utilizing Register 1 during the set up condition of the night shift and Register 2 for the run condition.

It may occur, however, that the day shift works on a job which is uncompleted at the end of the shift and it is desired that the night shift accumulate data on the same job on the same registers. This may be effected by operating the switch S1 to the lower position thereby connecting the winding RS relay through conductor 58, switch S1 in its lower position, conductor 118 to the lower contact of armature 117 and upper contact of armature 116, rather than to the upper contact of armature 117 and lower contact of armature 116 as before. In this way the same registers may be used in the same way during the night shift as during the day shift, notwithstanding switch 19 being in its left-hand position.

*Communication*

It may occur during the operation of the machine at the operator's station that the operator desires to call the foreman to his machine, seeks aid, repairs, or material, or desires the crane, a truck, or other help. He then utilizes his equipment represented by rectangle 2 and operates his switches 6 and 7, which are mechanically connected for operation in unison to a position corresponding to the message that he desires to communicate. It will be noticed that switch 6 is connected to ground through a diode 121 and that switch 7 is connected to ground through a diode 122, and that these diodes are poled oppositely. Switches 6 and 7 operate over respective banks of contacts. Alternate contacts of the lower bank are connected to the lamps 35, 36, 37 and 38 and to intermediate contacts of the other bank. Operating voltage is supplied to the lamps through conductor 123 and conductor 65 from the terminal 63 of the source. At terminal 63 positive pulses occur continuously and negative pulses intermittently. Thus if the switches are in position in which the connection is made through switch 6, then the corresponding lamp is energized continuously since the diode 121 is poled to pass the continuous positive pulses. If the switch is in a position in which the connection is made through switch 7 then the corresponding lamp is energized intermittently since the diode 122 is poled to pass only the intermittent negative pulses. Thus eight messages may be communicated through the four lamps.

*Alarm*

The operator's station signal box 1 includes an alarm switch 1 bearing the legend "Alarm" which in its normal position is, as illustrated, in the path of switch 3 when adjusted for delay. This switch is operated to its alternate position to sound an audible alarm by means of a loud speaker 125 shown at the bottom of FIG. 1 and which may be positioned at a suitable place on the factory floor or in the dispatcher's office. This loud speaker is supplied with oscillations of a suitable frequency, which may be generated by an oscillator 126 when rendered operative by relay 127 which responds to voltage applied to input terminals 128. The circuit for energization of the loud speaker 125 may be traced from the terminal 63 of equipment 64 through conductor 129, input terminals 128, conductor 132, through one or the other of the two red lights R1 or R2, dependent upon the position of the upper armature of the register selector relay RS, thence through conductor 80, armature 81 of relay BBD in its lower position if that relay be energized, conductor 77, armature 78 of the BBD relay, conductor 79, red lamp R in the operator's signal box, the "alarm" switch in its lower position and diode 130 to ground. Since diode 83 is poled to pass negative pulses these pulses, after amplification and rectification, energize the relay 127 which renders operative the oscillator 126 which intermittently sounds the alarm loud speaker. The red light R and either R1 and R2 are also lighted intermittently.

Should armature 81 not be in its lower position then the circuit may be completed through conductor 80, left-hand armature of the BD switch in its right-hand position, armature 78 of the BBD relay in its right-hand position and conductor 79 to the red light R, alarm switch, and diode 130 to ground.

Should the relay BBD be energized but the switch BD be in its left-hand position, then the circuit may be completed from conductor 80, through armatures 81 and 82 of the BBD relay and conductor 79 to the lamp R in the signal box.

*Relay RSX optional*

The auxiliary register selector relay RSX which controls the register selector relay RS may be included in the equipment merely as optional. If desired, it may be omitted if connections be made as represented by dotted lines at 132 and 133, switch S1 then being operated manually to control the register selector relay RS. Thus, for example, during the day shift operating potential is supplied from the 24 volt source through switch 19 and jack 13, connection 132 to the lower terminal of switch S1, requiring that that switch S1 be operated to the lower position if energization of the RS relay is to be had to provide the operations described above. During the night shift the operating potential is supplied through switch 19 in its left-hand position jack 14 and connection 133 to the upper contact of switch S1, thereby to provide energization during the night shift corresponding to that which has been described.

*Equipment 64*

The equipment represented by the rectangle 64 supplies the pulses at 63 and 96 for energization of the various lamps and the alarm loud speaker as has been described. This equipment may comprise a transformer T the primary of which is supplied with alternating current of suitable frequency. One terminal of the secondary is grounded and the other terminal is connected through switch 8 to the output terminal 63 and through switch 9 to the output terminal 96. These switches 8 and 9 are mechanically connected together for intermittent operation in unison. Switch 8 is shunted by a diode 10 poled to pass the positive half cycles of the voltage of the secondary of transformer T. Switch 9 has in series with it a diode 11 also poled to pass the positive half cycles of the voltage on the secondary of transformer T. Thus positive half cycles of the applied voltage appears intermittently on terminal 96.

Switch 8 supplies the entire sine wave intermittently to the terminal 63 and since diode 10 transmits the positive pulses continuously these appear on terminal 63 during the intermissions in the sine wave. Thus at terminal 63 continuous positive pulses appear and also intermittent negative pulses. At terminal 96 intermittent positive pulses appear.

While I have shown a particular embodiment of my invention it will, of course, be understood that I do not wish to be limited thereto since different modifications, both in the circuit arrangement and in the instrumentalities employed, may be made and I contemplate by the appended claims to cover any such modifications as fall within the true spirit and scope of my invention.

What is claimed as new and desired to be secured by Letters Patent of the United States is:

1. In a factory data collection system, an operator's switch having an operate position, a set up position and a delay position, each corresponding to a status condition of a machine at the operator's station, a pair of registers each corresponding to a respective one of said first two positions, and each having means for registering time when said switch is in the respective position, and means responsive to movement of said switch to the delay position to register the time said switch is in the delay position on that one of said registers corresponding to that one of the first two positions from which said switch was last operated.

2. In a factory data collection system, of an operator's station having a switch having two positions and movable from each of them to a third position, a register corresponding to each of said two positions, a relay operable to two positions and arranged in one position to select one register and in the other position to select the other register, means responsive to actuation of said switch to either of said two positions to actuate said relay to the corresponding position, said means being inoperative to produce actuation of said relay when said switch is moved from either of said two positions to said third position, whereby the register last selected remains selected when said switch is moved from either of said two positions to said third position, and means to record data generated at said station on the register selected whereby data generated when the switch is in said third position is recorded on the register corresponding to that one of the two positions from which it was actuated to said third position.

3. The combination, in a factory data collection system, of an operator's station having a switch having three positions corresponding to different status conditions of a machine operated at said station, and having circuit control means operated upon each operation to be counted, a pair of registers, each register comprising three counters to register operations to be counted, operating time, and delay time, respectively, means responsive to operation of said switch to each of two of said positions to register operations, and operating time, on respective counters of the register corresponding to the respective position of the switch, and means responsive to movement of said switch from either of said last two positions to the third position to register delay time on the register corresponding to the position from which said switch was last operated.

4. The combination of claim 3 with a plurality of indicators one for each counter, and means responsive to the position of said switch to energize the indicators corresponding to the counter on which data is being registered.

5. The combination of claim 4 with a preset counter arranged to measure the time said switch is in one of said positions and to cause the energization of the corresponding indicator to become intermittent after expiration of the time preset on said counter.

6. In combination, in a factory data collection system, of a switch having three positions corresponding to different status conditions of a machine operated at a first station, a second station having a pair of registers, each register including a plurality of counters for recording data generated at said first station, a lamp for each counter, a relay having an energized condition and a deenergized condition and operable in one condition to select a respective one of said counters and corresponding lamp, and in the other condition to select another of said counters and a corresponding lamp, a two-position latch relay having two operating windings, one operating the contacts of said relay from one position to another and the other operating the contacts of said relay from said other position to said one position, the contacts of said relay remaining in either position until actuated to the other by the corresponding coil, means responsive to operation of said switch at the operator's station to one of its three positions to energize one of said coils for operating said contacts in one position, means responsive to operation of said switch to a second of its three positions to energize the other coil to operate said contacts to their other positions, and means responsive to operation of said switch to a third position to maintain both coils deenergized, said contacts of said latch relay being arranged to energize said first relay when in one position and to deenergize it in the other whereby the counters and lamps last selected by said relay remain selected thereby when said switch is operated to said third position.

7. In combination, a switch having three positions located at an operator's station, a pair of registers each comprising a plurality of counters, a lamp for each of said counters, said counters each being adapted to record data of a particular variety generated at said station, means to record the time said switch is in one of said positions and occurrences at said station during said time on respective counters in one of said registers, means to record the time said switch is in another of said positions and occurrences at said station during said time on corresponding counters in the other register, means to record the time said switch is in said third position on a third counter in the register on which data was recorded when the switch was in that one of the first two positions from which it was last actuated, a plurality of lamps at said operator's station, one for each position of said switch, and means for selectively energizing one of said last lamps corresponding to the instant position of said switch and one of said first lamps corresponding to the instant counter on which data is being registered.

8. In combination, a switch having three positions located at an operator's station, a pair of registers each comprising a plurality of counters, a lamp adjacent each of said counters, said counters each being adapted to record data of a particular variety generated at said station, means to record the time said switch is in one of said positions and occurrences at said station during said time on respective counters in one of said registers, means to record the time said switch is in another of said positions and occurrences at said station during said time on corresponding counters in the other register, means to record the time said switch is in said third position on a third counter in the register on which data was recorded when the switch was in that one of the first two positions from which it was last actuated, a plurality of lamps at said operator's station, one for each position of said switch, and means for selectively energizing one of said last lamps corresponding to the instant position of said switch and one of said first lamps corresponding to the instant counter on which data is being registered, and means responsive to registration of data corresponding to a predetermined quantity to render the energization of said last mentioned lamp intermittent while the energization of the other lamp at said station is continuous.

9. In combination, a register station having a pair of registers, each comprising at least two counters, and a lamp associated with each counter; and operator's station; two control conductors and a lamp conductor extending between said stations; said operator's station comprising a switch having three positions and a position indicating lamp associated with each position; means responsive to operation of said switch to one of said positions and operable over one of said control conductors to select one of said registers, a counter therein and to energize an associated lamp and a respective position indicating lamp at said operator's station over said lamp conductor; means responsive to operation of said switch to a second position and operable over the other of said control conductors to select the other of said registers, a counter therein, and to energize the associated lamp and a respective position indicating lamp, over said lamp conductor; and means responsive to operation of said switch to a third position and operative over said control conductors to select the register last selected, a second counter therein, and to energize a second lamp associated with said selected counter and a respective position indicating lamp over said lamp conductor.

10. In combination, a register station having a pair of registers, each comprising at least two counters, and a lamp associated with each counter; an operator's station; two control conductors and a lamp conductor extending between said stations; said operator's station comprising a switch having three positions and a position indicating lamp associated with each position; means responsive to operation of said switch to one of said positions and operable over one of said control conductors to select one of said registers, a counter therein and to energize an associated lamp and a respective position indicating lamp at said operator's station over said lamp conductor; means responsive to operation of said switch to a second position and operable over the other of said control conductors to select the other of said registers, a counter therein, and to energize the associated lamp and a respective position indicating lamp, over said lamp conductor; and means responsive to operation of said switch to a third position and operative over said control conductors to select the register last selected, a second counter therein, and to energize a second lamp associated with said selected counter and a respective position indicating lamp over said lamp conductor; an additional counter; and means responsive to registration of a predetermined quantity therein to render intermittent the energization of the lamps then energized.

References Cited by the Examiner
UNITED STATES PATENTS

| | | | |
|---|---|---|---|
| 1,242,483 | 10/17 | Shuster et al. | 235—92 |
| 1,632,106 | 6/27 | Zogbaum | 340—366 |
| 1,771,953 | 7/30 | Conklin | 340—366 |
| 1,957,109 | 5/34 | Rosen et al. | 235—92 |
| 2,207,715 | 7/40 | Bumstead | 235—92 |
| 2,297,339 | 9/42 | Wilms et al. | 317—157 |
| 2,304,865 | 12/42 | Thumim | 317—157 |
| 2,469,655 | 5/49 | Leathers | 235—144 |
| 2,985,368 | 5/61 | Kohler et al. | 235—92 |

MALCOLM A. MORRISON, *Primary Examiner,*

WALTER W. BURNS, JR., *Examiner.*